United States Patent [19]

Frank

[11] 4,253,699

[45] Mar. 3, 1981

[54] DROPPED FLOOR MOTOR HOME CONSTRUCTION

[76] Inventor: Ronald R. Frank, 3950 Burnsline Rd., Brown City, Mich. 48416

[21] Appl. No.: 55,060

[22] Filed: Jul. 5, 1979

[51] Int. Cl.³ .............................................. B62D 25/20
[52] U.S. Cl. ..................................... 296/25; 180/90.6
[58] Field of Search ................ 296/25, 203, 204, 164; 180/89.1, 90.6

[56] References Cited

U.S. PATENT DOCUMENTS

| 2,098,357 | 11/1937 | Piroumoff | 296/25 |
| 3,941,261 | 3/1976 | Ricci | 296/25 |

FOREIGN PATENT DOCUMENTS 910372  9/1972  Canada ............................... 296/164

Primary Examiner—John J. Love
Assistant Examiner—Ross Weaver
Attorney, Agent, or Firm—Dale A. Winnie

[57] ABSTRACT

The improvement in motor home construction using a conventional height van vehicle, to provide greater dropped floor area and convenience, and which includes removing a section of the van floor over and on one side of the vehicle drive shaft to provide a floor opening exposing the drive shaft, prefabricating a pan member to fit said floor opening and cover said drive shaft, and having said pan member formed to provide a step covering over the drive shaft, a recessed area for greater toe clearance and turning ease, and structural reinforcement of interrupted frame members without a material change in the shaft and road clearances otherwise obtained.

6 Claims, 4 Drawing Figures

DROPPED FLOOR MOTOR HOME CONSTRUCTION

BACKGROUND OF THE INVENTION

A regular full sized, self contained, motor home is built to have adequate head room and standing space for both comfort and convenience. But, as a consequence, such motor homes are also built to such a height, above ground level, that they can not be parked or housed in the ordinary garage which was built for the family car.

Although efforts have been made to provide some type of pop-up top for the smaller sized vans and to outfit them for self-contained motor home use, none of these have been too successful.

While some success has been achieved in the use of a dropped floor in the smaller vans, to provide the desired standing space and head room in a vehicle having a relatively low profile, the extent of such use has been severly limited in having to be on just one side of the drive shaft which extends under the vehicle. And also because of the structural problem due to frame cross-members and the like which can not be interrupted.

Because of such limitations, most dropped floors in vans have been just at or near the access door, where they can extend to the side of the vehicle. Otherwise, they appear rather deep and narrow when made to extend lengthwise and in front of the storage cabinets and appliances. And, they are usually awkward to use or turn around in.

As a consequence, the dropped floor has appeared to have its limitations except for front wheel drive vehicles when and as developed for van use and motor home adaptation.

SUMMARY OF THE PRESENT INVENTION

The present invention relates to an innovation or difference in dropped floor construction which is particularly suited for van sized motor home use.

The invention hereinafter disclosed and described includes having not just the vehicle floor beside the vehicle drive shaft lowered but in also having the floor modified and dropped immediately over the drive shaft to provide what appears to be a side step and gives the appearance and convenience of a much wider and more serviceable floor in the van.

More particularly, a dropped floor unit is fabricated, as a self contained and constructed part, and then the vehicle floor both over and beside the vehicle drive shaft, in a designated area, is cut away. The dropped floor unit is then fitted in place and welded in as a structural component which bridges any cross members that it interrupts and is formed to extend closely next adjacent to the drive shaft and to lie closer over it, for the dropped floor and step effect that is desired.

In use, the deeper dropped floor portion extends from in front of and next adjacent the access door, along side the usual stove and sink appliances, while the step portion, over the drive shaft, is closer next adjacent the dinette or eating space and serves as a convenience in getting into and out of such space.

Further advantages will be more obvious from a reading of the detailed description which follows of the embodiment shown in the accompanying drawing figures.

DESCRIPTION OF THE DRAWING FIGURES

DETAILED DESCRIPTION OF ILLUSTRATED EMBODIMENT

Figure 1:
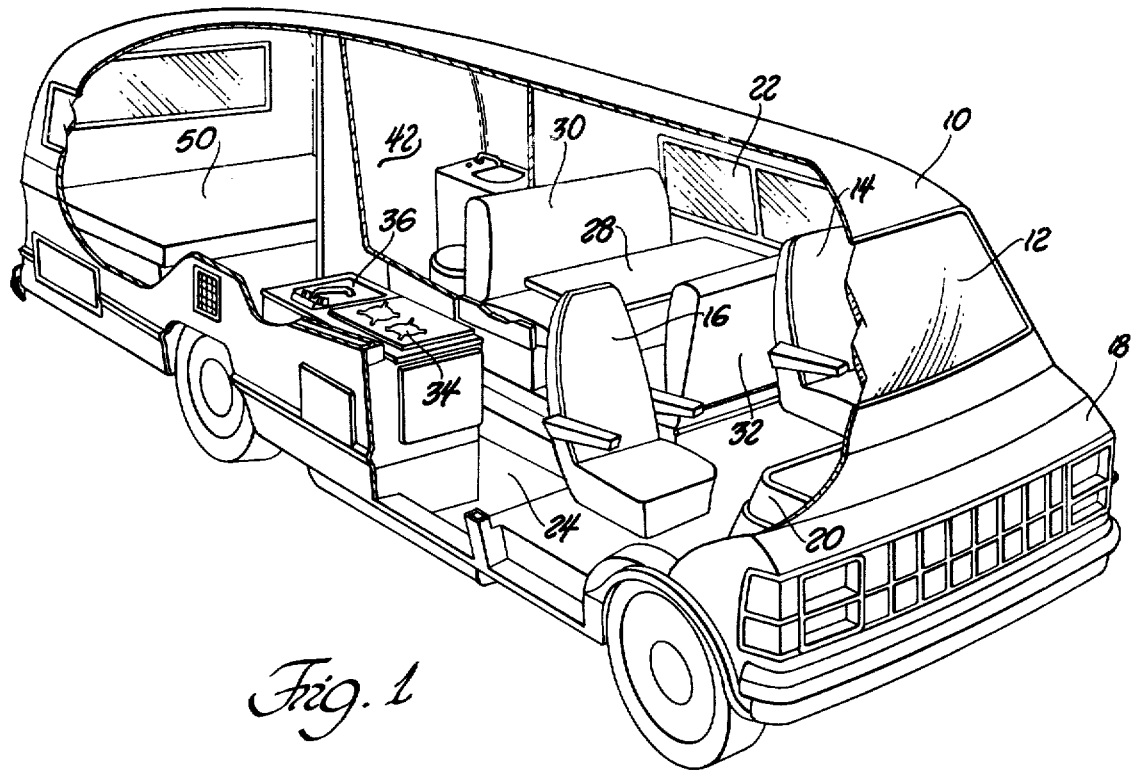
FIG. 1 is a pictorial representation of a motor home van with a side wall part cut away to show the dropped floor construction of the present invention.
Figure 2:
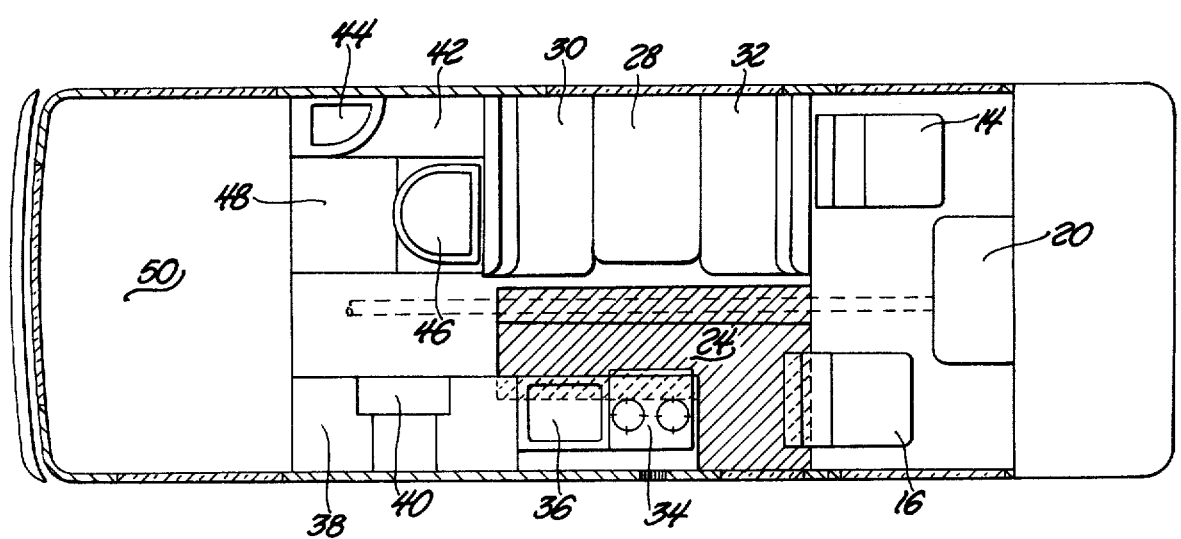
FIG. 2 is a diagrammatic plan view of the same motor home van showing the general arrangement of seats, furnishings and fixtures, as well as the dropped floor area in cross-hatch shaded contrast.

The motor home 10 shown in the drawing figures is of conventional van height such as allows it to be readily parked and stored in the family garage.

The driver's compartment 12 at the front of the vehicle includes the driver's seat 14 and a passenger seat 16 which swivals to face the living area, when and as desired. The vehicle engine is in front of the driver's compartment, under the hood or cowl 18 and with access also through a covering 20 which serves as a console in the driver's space.

Immediately behind the driver's compartment 12 is the living area 22 within which is located the dropped floor area 24 of the present invention. As will be appreciated, the dropped floor area is just behind the passenger seat 16 and starts right in front of the access door 26 and then extends back, in the aisle-way, as shown best by the cross hatch shading in the second drawing figure.

Within the living area space 22, just as a matter of relative orientation, will be seen the dinette table 28 and two facing seats 30 and 32, which fold down, with the table lowered, to provide additional sleeping accommodations.

Across from the dinette area are the stove-refrigerator 34 and the sink 36. And behind them, towards the back of the motor home, is closet space 38 and the furnace unit 40.

Across from the closet and furnace area is the bathroom space 42 within which is provided a corner vanity sink 44, an electric flush toilet 46. It is also finished to serve as the shower area 48. And behind this, at the back of the motor home, and extending across the width of the van, is a large double size bed 50.

Referring back now to the dropped floor area 24, with which this invention is principally concerned, certain details of construction are best shown and described with reference to FIGS. 3 and 4.

Figure 3:
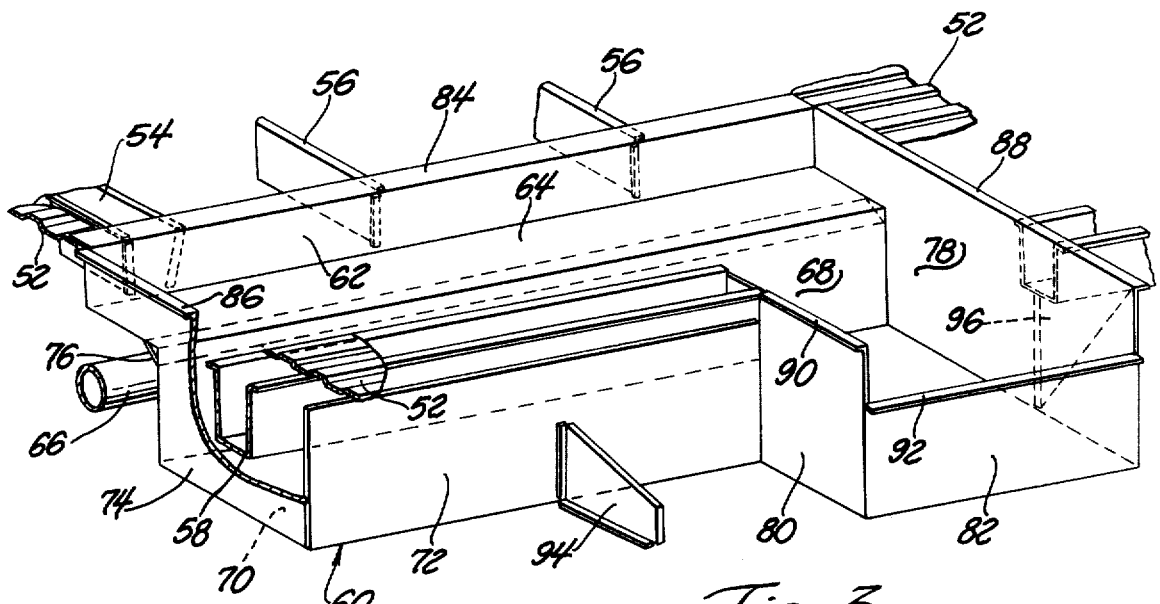
FIG. 3 is a perspective view of the dropped floor van member in relation to the van floor, main frame and cross members, and the vehicle drive shaft.

In FIG. 3 the van floor 52 is shown without carpeting and in its generally corrugated form for added strength and durability. Only small sections of the floor are shown, the rest being cut away to show the main cross member 54 and intermediate cross members 56 which are part of the overall unit body construction of the motor home van, together with one of the main frame members 58, which extends fore and aft of the motor home, near the outer side wall thereof.

The frame members 54, 56 and 58, together with the floor covering over them, are required to be cut away to provide the space within which the dropped floor is to be provided. And, since these frame members are structural members of the unit body construction, it is important that the rigidity and structural stability which they were intended to provide, before being cut away, be preserved.

Accordingly, the whole of the dropped floor area is made as a pan member 60, closed on all sides and open upwardly, and to have certain of its side walls, and/or end walls, providing a structural tie or cross brace between the ends of unit body frame members.

The pan member 60 is shown to have a long side wall 62, of the same relative depth as the main and intermediate cross members 54 and 56, across which it extends, and to have this same wall welded to the butt ends of such cross members. Then a right angle bend is provided, to form a step covering 64 that extends over the vehicle drive shaft 66. Thereafter, another right angle bend forms the inner side wall 68 for the dropped floor 70 which is closed by the outer side wall 72, spaced about fourteen and a half inches apart therefrom.

Figure 4:
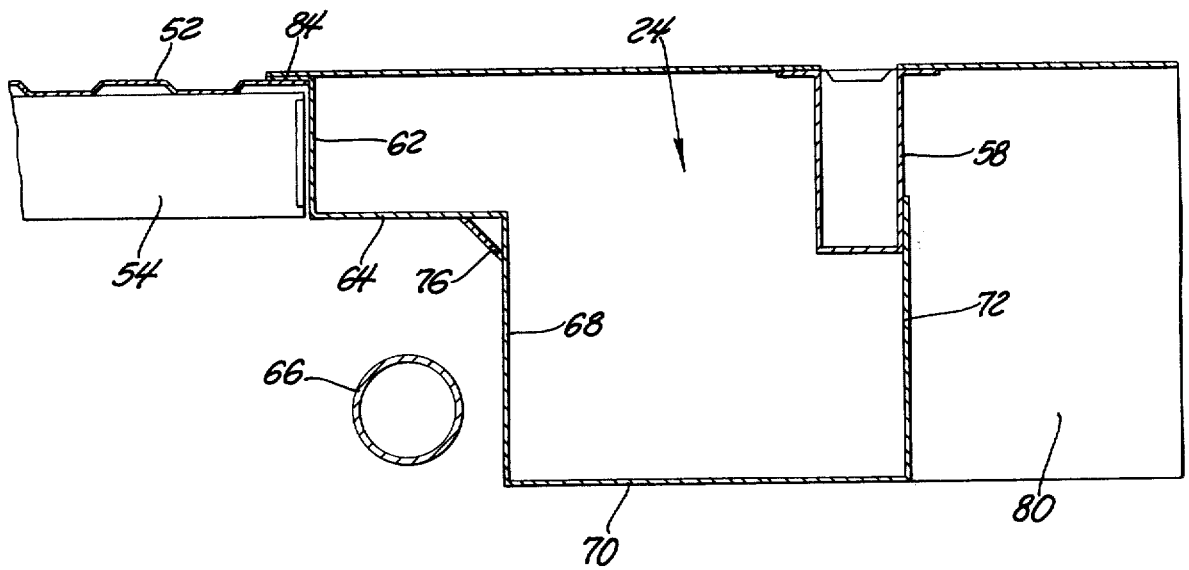
FIG. 4 is a cross-sectional view of the dropped floor van member as taken transversely therethrough in the narrower part in front of the appliances with which the motor home is equipped.

As shown in FIG. 4, the main frame member 58 is somewhat deeper than the cross members 54 and 56, and the side wall 72 of the dropped floor pan member will also be appreciated as standing somewhat higher than the inner side wall 70 so that there is a reasonable overlap on the outer side of the main frame member and sufficient for a good strong seam weld the length thereof.

From the foregoing, in the area of the narrower cross-section of the dropped floor section, it will be seen that the main and intermediate cross members have been laterally tied together and that the two progressive right angle bends, in forming the step covering 64, have added further structural strength, and then, further, the deep foot well or pan area forms a channel shape for structural strength that ties in to the van's frame member 58.

To further assure the rigidity in the structure described, an end wall 74 is provided, and the right angle bend over the drive shaft may be reinforced by a piece of flat stock 76 welded thereacross and extending the full length thereof.

Similarly, in the wider part of the dropped floor area, where the main frame member 58 is interrupted, to allow the dropped floor area to be provided outwardly to the door opening, an end wall 78 and an intermediate end and closure wall 80 is provided along with the outer side wall 82.

All of the side and end walls 62, 74, 78, 80 and 82 are formed to include an outwardly turned flange, which are respectively identified as 84, 86, 88, 90 and 92, at the upper ends which adds strength and rigidity and also serves as a welding lip or flange for securing the respective side walls, and in turn, the whole dropped floor pan member to the vehicle floor and in place as an integral structural unit and part of the overall construction.

As needed, further gussets such as 94 and 96 may be added where and as desired.

From the foregoing, it will be seen that the dropped floor construction which has been provided is wider than might be expected by the step covering 64 over the drive shaft, and the added toe space under the main frame member 58. Although the step area is relatively shallow, compared to the deeper foot well space, it gives the visual impression of greater foot space and in fact does provide greater convenience in allowing a lower disposed area to step or rest one's foot upon. At the same time, the step covering is no lower over the drive shaft than the regular cross members would be, so there need be no concern for interference therewith.

Dimensionally, in the embodiment shown and discussed, the full depth of the dropped floor area, from the regular van floor height, is 15" lower. The step is about 5" lower and the width of the full depth space is 14½" while the step space is about 7" wide. At the doorway, into the living area space, the dropped floor is about 20" wide and 24" across, allowing reasonably good and adequate space to stand and turn around in.

I claim:

1. In a conventional height van vehicle, modified for motor home use, and having a forwardly mounted vehicle engine and a drive shaft extended rearwardly therefrom and under the van floor, the improvement in dropped floor construction, for providing greater head room, comprising;
   removing a given width and length of the van floor and such sections of intermediate and main cross frame members as extend thereunder,
   said van floor being removed immediately over and to one side of said drive shaft for providing a floor opening having said drive shaft exposed and extending along one side thereof
   removing an additional section of the van floor, and such sections of the main frame member as extend thereacross, for enlarging said floor opening at one end thereof and having it extend towards the door wall of said van vehicle,
   and a prefabricated pan member formed to fit said floor opening and its side extension to provide a dropped floor area alongside said drive shaft and a step covering thereover,
   said step covering providing protection for said drive shaft and structural reinforcement lengthwise for said pan member.

2. The dropped floor construction for conventional height van vehicles as provided by claim 1,
   said pan member having the side wall thereof, next adjacent and over said step, being formed to have a flanged edge for engagement with and being welded to the van floor,
   said side wall being also formed to a depth for butt end welding to the intermediate and main cross frame members for providing a structural cross member therebetween,
   and said step covering being formed immediately therebeneath and providing successive right angle structural reinforcements the full length of said pan member.

3. The dropped floor construction for convention height van vehicles, as provided by claim 1,
   said pan member being formed with an outboard side wall thereof for fixed engagement with a fore and aft frame member on the outboard side thereof to provide added toe turning clearance under said frame member and within said dropped floor area.

4. The dropped floor construction for conventional height van vehicles, as provided by claim 1,
   said step covering being provided at a relative height over said drive shaft approximating that of regular frame cross members to allow for engineered clearance and having a width near half again that of the width of the dropped floor area.

5. The dropped floor constructional height van vehicles as provided by claim 1,
   said pan member being formed with an outboard side wall thereof for fixed engagement with a fore and aft frame member on the outboard side thereof to provide added toe turning clearance under said frame member and within said dropped floor area.

said step covering being provided at a relative height over said drive shaft approximating that of regular frame cross members to allow for engineered clearance and having a width near half again that of the width of the dropped floor area.

6. The dropped floor construction for conventional height van vehicles, as provided by claim 1, said pan member having the side wall thereof, next adjacent and over said step, being formed to have a flanged edge for engagement with and being welded to the van floor, said side wall being also formed to a depth for butt end welding to the intermediate and main cross frame members for providing a structural cross member therebetween, and said step covering being formed immediately therebeneath and providing successive right angle structural reinforcements the full length of said pan member, said pan member being formed with an outboard side wall thereof for fixed engagement with a fore and aft frame member on the outboard side thereof to provide added toe turning clearance under said frame member and within said dropped floor area, said step covering being provided at a relative height over said drive shaft approximating that of regular frame cross members to allow for engineered clearance and having a width near half again that of the width of the dropped floor area.

* * * * *